United States Patent [19]

Chambers et al.

[11] Patent Number: 5,029,717

[45] Date of Patent: Jul. 9, 1991

[54] CRANE

[76] Inventors: James L. Chambers, 133 W. 19th, Concordia, Kans. 66901; James W. Norris, Box 6, Norway, Kans. 66961

[21] Appl. No.: 468,198

[22] Filed: Jan. 22, 1990

[51] Int. Cl.[5] .......................... B66C 23/04; B60P 1/04

[52] U.S. Cl. .................................... 212/231; 414/467; 414/921; 212/255; 212/261; 212/204

[58] Field of Search ............... 212/176, 182, 184, 199, 212/201, 203, 204, 223, 227, 229, 230–232, 237, 238, 244, 253–255, 260, 261, 264, 265; 414/921; 5/83–87

[56] References Cited

U.S. PATENT DOCUMENTS

| | | | |
|---|---|---|---|
| 312,423 | 2/1885 | Bezancon | 212/250 |
| 348,726 | 9/1986 | Driver | 212/265 |
| 505,654 | 9/1893 | Hale | 212/199 |
| 548,375 | 10/1895 | Loveridge | 212/264 |
| 1,134,707 | 4/1915 | Stone | 212/204 |
| 2,272,949 | 2/1942 | Kidder | 212/204 |
| 2,389,872 | 11/1945 | Ruger et al. | 212/261 |
| 2,509,950 | 5/1950 | Zierke . | |
| 2,528,588 | 11/1956 | Forslund | 212/204 |
| 2,796,996 | 6/1957 | Sundin | 212/231 |
| 3,181,707 | 5/1965 | Janssen | 212/204 |
| 3,301,416 | 1/1967 | Bopp | 212/199 X |
| 3,326,391 | 6/1967 | Adolfsson | 212/231 |
| 3,367,512 | 2/1968 | Kaplan | 212/182 |
| 3,656,637 | 4/1972 | Lynn et al. . | |
| 3,854,594 | 12/1974 | Brookes . | |
| 3,957,164 | 11/1978 | Brown . | |
| 4,090,625 | 5/1978 | Walters | 212/268 |
| 4,127,200 | 7/1983 | Mana . | |
| 4,391,371 | 7/1983 | Paffrath . | |
| 4,406,574 | 9/1983 | Riley . | |
| 4,508,233 | 4/1985 | Helms | 212/182 |
| 4,565,482 | 1/1986 | Baker . | |

FOREIGN PATENT DOCUMENTS

| | | | |
|---|---|---|---|
| 2566379 | 12/1985 | France | 212/182 |
| 716047 | 10/1966 | Italy | 212/204 |

*Primary Examiner*—Joseph F. Peters, Jr.
*Assistant Examiner*—R. B. Johnson
*Attorney, Agent, or Firm*—Litman, McMahon & Brown

[57] ABSTRACT

A crane or lifting device includes a base assembly with a telescopic and rotatable column mounting a boom assembly including a telescopic boom arm. A strap is connected at one end thereof to the base assembly, extends through the boom arm, and is connected at another end thereof to a hook for engaging a load. An extensible/retractable jack assembly innerconnects the column and the boom arm for raising and lowering the boom arm. The crane can be mounted in an automobile trunk for raising and lowering the boom assembly.

2 Claims, 2 Drawing Sheets

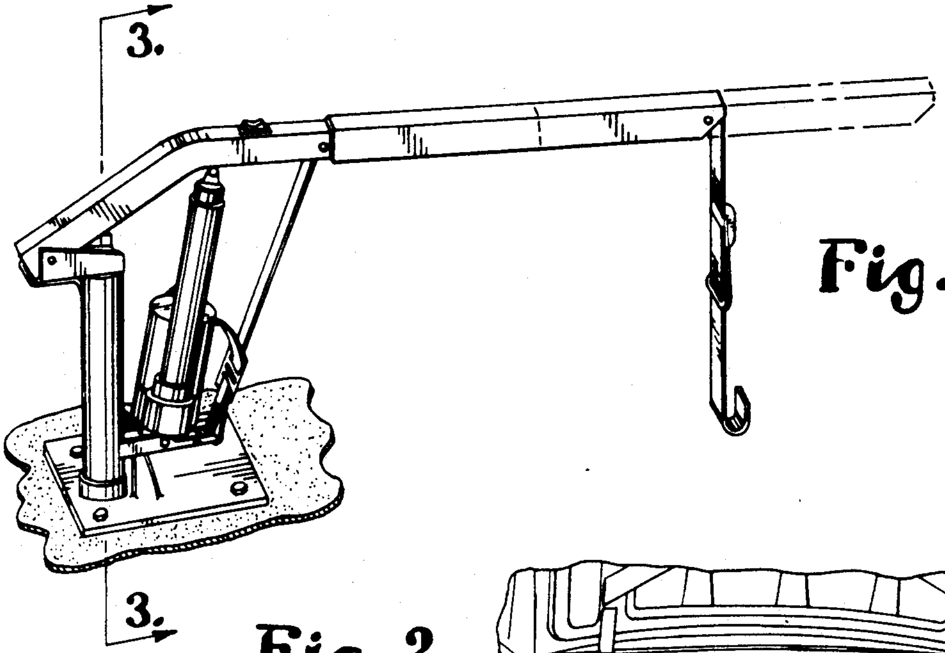
Fig. 1.
Fig. 2.
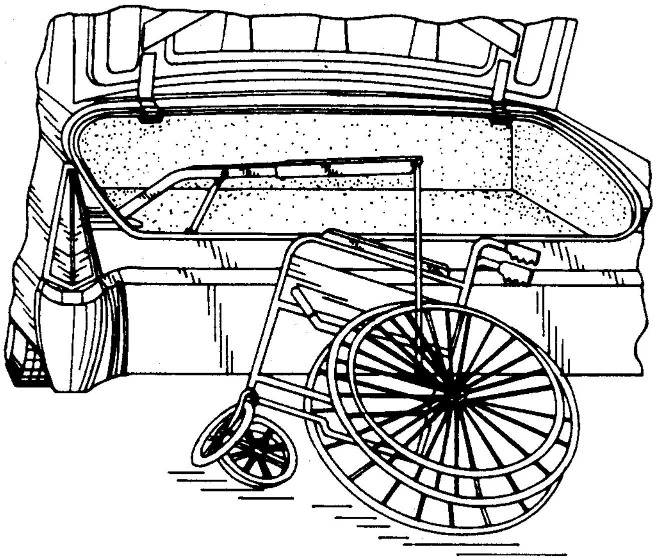
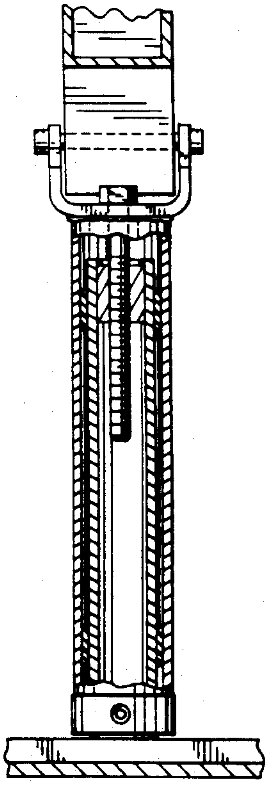
Fig. 3.
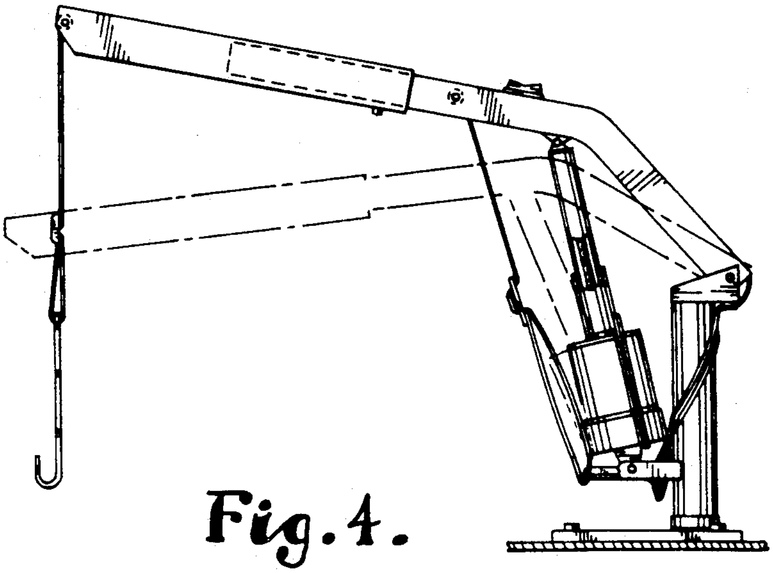
Fig. 4.

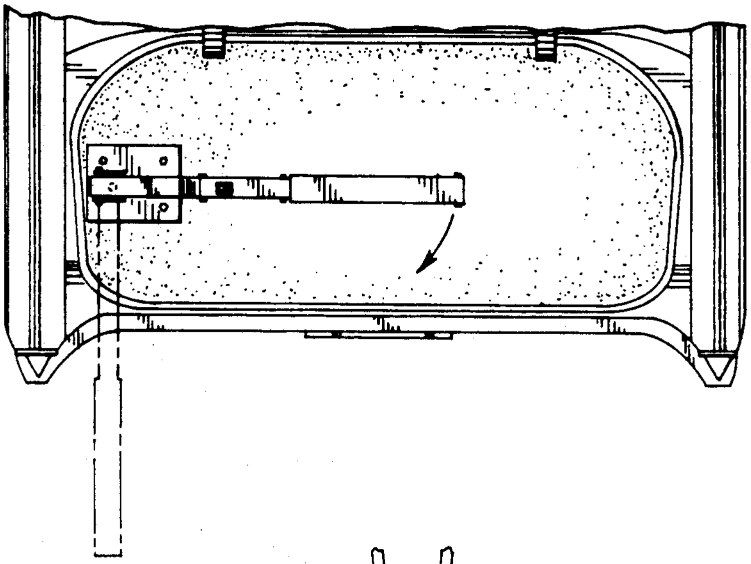
Fig. 5.
Fig. 6.
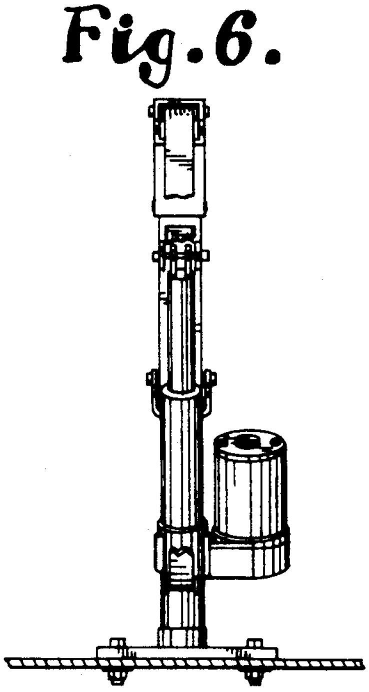
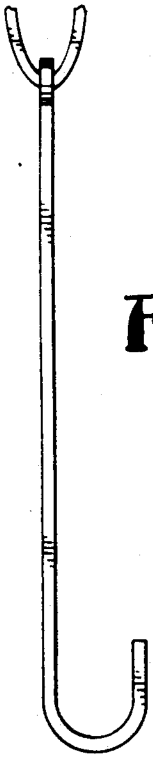
Fig. 7.
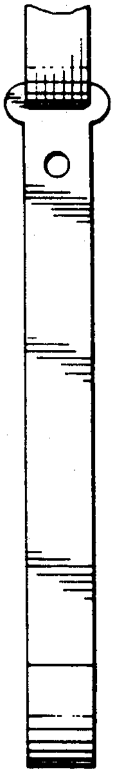
Fig. 8.
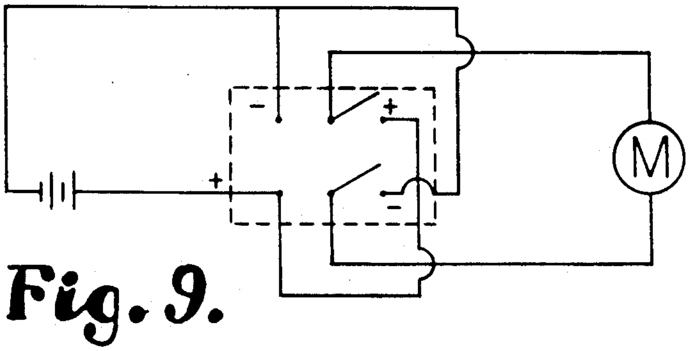
Fig. 9.

CRANE

BACKGROUND OF THE INVENTION

1. Field of the Invention

The present invention relates generally to hoisting and lifting devices, and particularly to a crane for mounting in a vehicle trunk.

2. Description of the Prior Art

A variety of devices have heretofore been utilized for applications requiring the hoisting and lifting of various loads. Cranes comprise one class of such devices and are generally adapted for swinging movements in combination with lifting movements. Large cranes find application in various commercial and industrial situations, e.g. construction, mining, cargo handling, etc.

Smaller capacity cranes and other lifting devices have been provided for applications, such as the loading and unloading of passengers and cargo in vehicles. For example, hoists have heretofore been installed in vans and buses for boarding and deboarding wheelchair-bound persons while still seated in their wheelchairs. See, for example, the Brown U.S. Pat. No. 3,957,164. Many people who have difficulty walking are quite capable of operating an automobile and are quite mobile with the assistance of a wheelchair. Difficulties are encountered by many such people when their wheelchairs must be transported with them in their vehicles. Loading and unloading a relatively bulky and cumbersome piece of equipment such as a wheelchair can be quite difficult without assistance, especially for a person with a disability or infirmity. Thus, wheelchair-bound persons have heretofore suffered from significant restrictions on their personal mobility and independence due to the difficulties that they encountered in loading and unloading their mobility equipment, i.e. wheelchairs, self-propelled personal mobility vehicles, etc. Many people are inconvenienced by a reliance on their mobility equipment and the need to take it wherever they go.

The Mann U.S. Pat. No. 4,127,200 discloses a wheelchair lift device for mounting in a vehicle trunk, but operation of this device requires certain steps for setting it up which may prove difficult or time-consuming. Heretofore there has not generally been available a crane or lift device with the advantages and features of the present invention.

SUMMARY OF THE INVENTION

In the practice of the present invention, a crane or lift device is provided for raising, lowering and swinging objects. The crane includes a base assembly with a base plate and a column subassembly extending upwardly from the base plate. The column subassembly is adapted for telescopic height adjustments and for rotation with respect to the base plate. A boom assembly is mounted on the column subassembly and includes telescopically interconnected boom arm members. A jack assembly includes a telescoping jack member subassembly with a screw-threaded rod for extension and retraction. A drive unit is drivingly connected to the rod. A strap is connected at one end to the base assembly and mounts a hook at its other end for engaging a load. The strap is reeved over pulleys in the boom arm.

OBJECTS AND ADVANTAGES OF THE INVENTION

The principal objects and advantages of the present invention include: providing a crane; providing a crane for lifting and swinging objects; providing such a crane which is adaptable for mounting in or on a vehicle; providing such a crane which can load and unload objects in and from a vehicle trunk; providing such a crane which includes a jack mechanism or assembly; providing such a crane wherein the jack assembly or mechanism is powered; providing such a crane which is adapted for loading and unloading a wheelchair; providing such a crane which can be installed in many automobile trunks; providing such a crane which is economical in construction, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top perspective view of a crane or lift device embodying the present invention.

FIG. 2 is a top perspective view of the crane, shown mounted in a vehicle trunk and loading or unloading a wheelchair.

FIG. 3 is an enlarged, fragmentary, vertical, cross-sectional view of the crane taken generally along line 3—3 in FIG. 1.

FIG. 4 is a side elevational view of the crane.

FIG. 5 is a top plan view of the crane and a fragmentary, top plan view of the automobile trunk in which it is shown mounted.

FIG. 6 is an enlarged, front elevational view of the crane.

FIG. 7 is an enlarged, side elevational view of the crane, particularly showing a hook thereof.

FIG. 8 is an enlarged, front elevational view of the crane, particularly showing a hook thereof.

FIG. 9 is an electrical schematic drawing of a circuit for a drive motor of the crane.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 10 generally designates a crane embodying the present invention. Without limitation on the generality of useful applications of the crane 10, an exemplary application is shown in the trunk 12 of an automobile 14 with the crane 10 mounted on a trunk floor 16. The trunk 12 can be selectively closed by a trunk lid 17.

The crane 10 generally comprises a base assembly 18, a boom assembly 20 and a jack assembly 22.

II. Base Assembly 18

The base assembly 18 includes a base plate 24 with an upper surface 26. The base plate 24 is mounted on the trunk floor 16 by mounting bolts 28. A column subassembly 30 projects upwardly from the base plate upper surface 26 and includes an inner tubular member 32 with a lower end 34 affixed (e.g. welded) to the plate upper surface 26 and an upper end 36. The inner tubular member includes a coaxial bore 38. An outer tubular member 40 includes lower and upper ends 42, 44 and a coaxial bore 46 extending therebetween.

An annular lower bushing 48 is secured, e.g. by press-fitting in the bore 46 of the outer tubular member 40 adjacent to its lower end 42 and slidably engages the inner tubular member 32. An annular upper bushing 50 is affixed, e.g. press-fit, to the inner tubular member 32 adjacent to its upper end 36 for sliding engagement with the outer tubular member bore 46. The bushings 48, 50 provide bearing means for rotational and reciprocal movement between the tubular members 32, 40 with respect to each other. The bushings 48, 50 preferably comprise a material with a relatively low coefficient of friction, e.g. nylon or high molecular weight (HMW) plastic to facilitate rotation and reciprocation between the tubular members 32, 40.

A collar 52 with a set screw 54 is received on the inner tubular member 32. The lower end 42 of the outer tubular member 40 is adapted to abutt the upper edge of the collar 52 in a sliding engagement whereby the tubular members 32, 40 can rotate with respect to each other. The overall height of the column subassembly 30 can be adjusted by vertically repositioning the collar 52 on the inner tubular member 32.

A clevis subassembly 56 includes a clevis bracket 58 with a base 60 affixed (e.g. welded) to the outer tubular member upper end 44 and a spaced pair of upstanding side walls 62 with a pivot pin 64 extending therebetween. A plug 66 with a coaxial, threaded receiver 68 is fixedly positioned in the inner tubular member bore 38 adjacent to the inner tubular member upper end 36 and is adapted to threadably receive a bolt 70 which is rotatably received in a clevis receiver 72 in the clevis base 60. The bolt 70 retains the outer tubular member 40 on the inner tubular member 32, and can be threadably repositioned when the length of the column subassembly 30 is adjusted. For normal operation the bolt 70 would be loose enough to permit relative rotation between the inner and outer tubular members 32, 40.

For installation in many automobile trunks, the column subassembly 30 can provide for about four inches of adjustment in length to accommodate the configurations and dimensions of various automobile trunks. The bolt 70 should be of sufficient length to provide for adjustability of the height of the column subassembly 30. Of course, bolts of different lengths could be employed to connect the tubular members 32, 40 in different lengths.

III. Boom Assembly 20

The boom assembly 20 includes a boom arm 74 comprising inner and outer arm members 76, 78. The inner arm member 76 includes proximate and distal sections 80, 82 forming a downwardly-open obtuse angle and an intersection 84. The inner arm member 76 includes a proximate end 86 pivotally connected to the clevis subassembly 56 by the pivot pin 64 and a distal end 88.

The outer arm member 78 includes a proximate end 90 and a distal end 92. The outer arm member 78 is undercut (e.g. at about a 45 degree angle miter-cut at the intersection of its distal end 92 and its bottom face.

The arm members 76, 78 can comprise hollow steel tubing with generally square cross-sectional configurations. The outer arm member 78 telescopically and slidably receives the inner arm member 76.

Inner and outer pulleys 94, 96 are rotatably mounted in the inner arm member 76 in spaced relation outwardly from its intersection 84 and in the outer arm member 78 adjacent to its distal end 92 respectively by inner and outer pulley axles 98, 100. The lower face of the inner arm member 76 includes an opening 102 below and in proximity to the inner pulley 94. A set screw 103 is provided on the bottom face of the outer arm member 78 for impinging upon the inner arm member 76 whereby the arm members 76, 78 may be adjustably secured with respect to each other.

A tensile member comprising a strap 104 includes inner and outer ends 106, 108 forming inner and outer loops 110, 112 with inner and outer slidable, link-adjusting clasps or buckles 114, 116. A hook 118 is secured to the strap outer end 108 by the outer loop 112.

IV. Jack Assembly 22

The jack assembly 22 includes a lower mounting bracket 120 affixed (e.g. welded) to the outer column tubular member 40 in proximity to its lower end 42 and projecting laterally therefrom. The lower mounting bracket 120 receives a transverse jack lower pivot pin 122 and forms a strap slot 124 adjacent to its outer end for receiving the strap inner loop 110.

A jack member subassembly 126 includes telescopically interconnected outer/lower and inner/upper jack tubular members 128, 130.

A screw-threaded rod 132 is placed in the jack member subassembly 126 for telescopically extending and retracting the tubular members 128, 130 with respect to each other. A drive unit 134 is mounted on the jack member subassembly 126 and includes a reversible electric motor 136 drivingly connected to a transmission or speed reducer gear unit 138, which in turn is drivingly connected to the screw-threaded rod 132. A thrust bearing (not shown) is preferably provided to carry the axial compression load on the screw-threaded rod 132 and the transmission shaft to which it is connected. A suitable drive unit 134 is commercially available from the Dayton Electric Manufacturing Company, Chicago, Ill. 60648. The jack member subassembly can be provided with an overload clutch for the drive unit 134 and an anti-reverse ratchet mechanism.

Referring to the electrical schematic, FIG. 9, the electric motor 136 is connected to a source of electrical power 140, which can comprise the electrical system of the vehicle 14. The flow of electrical current from the power source 140 to the electric motor 136 is controlled by a double-pole, double-throw (DPDT) switch 142 mounted on top of the inner boom arm member 76. The switch 142 can comprise a momentary contact rocker switch which automatically returns to a center "off" position when released. The electrical circuit 144 (FIG. 9) can be arranged so that pressing one side of the switch 142 causes the motor 136 to rotate in a first direction for extending the jack member subassembly 126, and pressing the other side of the switch 142 causes the electric motor 136 to rotate in a second direction opposite to the first direction for retracting the jack member subassembly 126. Extending and retracting the jack member subassembly 126 causes the boom arm 74 to raise and lower respectively. Electrical wiring leads 145 interconnect the motor 136, the electrical power sources 140 and the switch 142, and may be run through the inner arm member 76 for connection to the switch 142.

The jack member subassembly 126 is pivotally connected at an upper end of its inner/upper tubular member 130 to an ear 146 mounted on a lower face of the inner boom arm tubular member 32 by an upper jack pivot pin 148. The relative positions and spacing between the boom arm pivot pin 64 and the upper jack pivot pin 148 are factors in determining the lifting height and capacity of the crane 10. An exemplary location for the upper jack pivot pin 148 is slightly outwardly from the inner arm member intersection 84. Moving the upper jack pivot pin 148 further outwardly on the boom arm 74 can increase the power exerted by the jack member subassembly 126, but the lifting height would be shortened. The opposite consequences would occur from moving the upper jack pivot pin inwardly (i.e. closer to the boom arm pivot pin 64).

V. Operation

Although the crane 10 is shown mounted in an automobile trunk 12, there is a wide variety of other useful applications. For example, other vehicles with hatchback, station wagon and pickup truck configurations could employ the crane 10 for raising, lowering and swinging various objects.

FIG. 2 shows the crane 10 engaging a wheelchair 50 for loading into the automobile trunk 12. For a wheelchair-bound person, the crane 10 thus offers great opportunities for mobility and self-reliance. Many wheelchairs are designed for folding to a collapsed, relatively flat configuration as shown in FIG. 2 for compact storage, e.g. in an automobile trunk. With the wheelchair 150 collapsed, the hook 118 may be engaged on a suitable member 152 of the wheelchair 150 (preferably near its center of gravity) with the boom arm 74 in its lowered position. The switch 142 is then depressed to raise the boom arm 74 to a sufficient height for clearing the rear parts of the automobile 14 for entrance into the trunk 12. When the wheelchair 150 is fully raised in a collapsed configuration, it will preferably assume a generally horizontal position. The boom arm 74 can then be swung forwardly (which rotates the base column tubular members 32, 40 with respect to each other) until the wheelchair 150 is positioned for lowering into the automobile trunk 12. The wheelchair 150 may then be lowered into a storage position by pressing the "lower" side of the switch 142 to lower the boom arm 74.

The configuration of the strap 104 extending through the boom arm 74 over the pulleys or rollers 94, 96 facilitates the lifting operation of the crane 10. In a lifting mode of operation, the strap passes and is retracted inwardly through the boom arm 74 as the distance between the strap inner end 106 and the inner pulley 94 increases, thereby further raising the load as the hook 118 is drawn upwardly towards the outer pulley 96. In a lowering mode of operation, the strap is let out from the end of the boom arm 74 and thereby expedites lowering the load.

Several aspects of the crane 10 can be adjustable to accomodate various lifting tasks in various applications, e.g. various loads, various vehicles, etc. Specifically, the height of the column subassembly 30, the length of the boom arm 74 and the length of the strap 104 can all be readily adjusted. For example, the height of the column subassembly 30 can be adjusted by loosening the set screw 54, raising or lowering the collar 52, and threadedly raising or lowering the bolt 70 with respect to the plug 66. As mentioned before, the spacing relationships of the pivot pins 64, 122 and 148 would also affect the range of motion of the boom arm 74 and the lifting capacity of the crane 10. The motor 136 and the transmission/gear speed reducer unit 138 are also significant in determining the operational characteristics of the crane 10. It will be appreciated that all of these characteristics and others would affect the performance and operating characteristics of the crane 10. The components are preferably sized to cooperate in providing a desired lifting capacity. An overload clutch mechanism may be provided for the drive unit 134 to prevent a predetermined maximum lifting capacity from being exceeded.

It is to be understood that while certain forms of the present invention have been illustrated and described herein, it is not to be limited to the specific forms or arrangement of parts described and shown.

What is claimed and desired to be secured by Letters Patent is as follows:

1. A crane, which includes:

(a) a base assembly including:
  (1) a base plate with an upper surface;
  (2) a column subassembly mounted on and projecting upwardly from said base plate upper surface and including:
    (i) an inner tubular member with a lower end affixed to said base plate and an upper end;
    (ii) an outer tubular member telescopically receiving said inner tubular member and including upper and lower ends;
    (iii) a lower, annular bearing sleeve associated with said outer tubular member lower end and positioned between said inner and outer tubular members;
    (iv) an upper, annular bearing sleeve associated with said inner tubular member upper end and positioned between said inner and outer tubular members; and
    (v) a collar selectively, axially slidably received on said inner tubular member and having a set screw adapted for impinging upon said inner tubular member, said collar being adapted for rotatable engagement by said outer tubular member lower end;
  (3) a clevis subassembly including:
    (i) a clevis bracket with a clevis base and a pair of side walls extending upwardly therefrom;
    (ii) a plug with a threaded receiver positioned in said inner tubular member adjacent to its upper end;
    (iii) a mounting bolt extending through said bracket base and threadably received in said plug receiver; and
    (iv) a pivot pin extending transversely between said clevis side walls;

(b) a boom assembly including:

(1) a boom arm subassembly including an inner boom arm tubular member with proximate and distal sections having proximate and distal ends respectively and an outer boom arm tubular member having proximate and distal ends and telescopically receiving said inner boom arm member distal section;

(2) said inner boom arm member proximate and distal sections forming an obtuse angle with respect to each other, said angle opening generally downwardly; and (3) said inner boom arm member proximate end receiving said clevis pivot pin for pivotable mounting on said clevis;

(c) an engagement means subassembly including a strap having proximate and distal ends, inner and outer pulleys positioned within said inner and outer arm members respectively with said strap reeved thereover, a hook member mounted on said strap distal end and strap length adjustment means comprising a slide clasp slidably receiving said strap; and (d) a jack assembly including:

(1) a telescopic jack member subassembly including inner and outer telescopic tubular members interconnected by a screw threaded rod and upper and lower ends;

(2) an electric, reversible drive motor drivingly connected to said threaded rod;

(3) a jack mounting bracket projecting laterally from said base outer tubular member and pivotably mounting said jack member lower end and said strap proximate end;

(4) pivotal connection means pivotally interconnecting said jack member upper end and said inner boom arm in proximity to the intersection of said inner boom arm member proximate and distal sections; and·

(5) an electrical switch electrically connected to said drive motor and adapted for connection to an electrical power source for selectively controlling and reversing the flow of current to said motor, said switch being mounted on said inner boom arm member.

2. A crane, which includes:

(a) a base assembly with a column having upper and lower ends;

(b) a boom assembly including:

(1) an inner boom arm movably through a generally vertical range of movement with a proximate end pivotally mounted on said column and a distal end, an outer boom arm telescopically receiving said inner boom arm;

(2) engagement means suspended from said outer boom arm and adapted for engaging an object to be lifted;

(3) a mounting bracket affixed to said column in proximity to said lower end thereof and projecting laterally therefrom:

(c) an extensible/retractable jack assembly including a lower end connected to said mounting bracket and an upper end connected to said inner boom arm in spaced relation outwardly from said boom arm proximate end;

(d) said engagement means comprising;

(1) a tensile member with a proximate end connected to said mounting bracket and a distal end;

(2) hook means connected to said tensile member distal end; and (3) tensile member sliding means slidably mounting said tensile member on said mounting bracket for extending and retracting said tensile member with respect to said inner boom arm distal end and said outer boom arm as said boom arms are lowered and raised respectively; and (4) pulley means mounted on said inner and outer boom arms for engaging said tensile member;

(e) rotation means connected to said column and operative to permit said boom arms to swing with respect to said base assembly about a generally vertical rotational axis;

(f) said vertical rotational axis extending coaxially through said column;

(g) said column comprising inner and outer tubular members telescopically interconnected;

a collar vertically adjustably mounted on said inner tubular member and adapted for engagement by said outer tubular member;

each of said tubular member having upper and lower ends;

said collar being adapted to engage said outer tubular member lower end; and a retailing bolt adjustably interconnecting said tubular member upper ends for limiting extension of said outer tubular member with respect to said inner tubular member.

* * * * *